(12) United States Patent
Huang et al.

(10) Patent No.: US 12,336,025 B2
(45) Date of Patent: Jun. 17, 2025

(54) SYSTEM AND METHOD FOR SIDELINK SLOT INDICATION

(71) Applicant: ZTE CORPORATION, Guangdong (CN)

(72) Inventors: Shuanghong Huang, Shenzhen (CN); Youxiong Lu, Shenzhen (CN); Weimin Xing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 474 days.

(21) Appl. No.: 17/876,882

(22) Filed: Jul. 29, 2022

(65) Prior Publication Data
US 2022/0369397 A1 Nov. 17, 2022

Related U.S. Application Data

(63) Continuation of application No. PCT/CN2020/084330, filed on Apr. 10, 2020.

(51) Int. Cl.
| | |
|---|---|
| *H04W 76/14* | (2018.01) |
| *H04L 5/00* | (2006.01) |
| *H04W 72/0446* | (2023.01) |
| *H04W 76/15* | (2018.01) |

(52) U.S. Cl.
CPC .......... *H04W 76/14* (2018.02); *H04L 5/0094* (2013.01); *H04L 5/0098* (2013.01); *H04W 72/0446* (2013.01); *H04W 76/15* (2018.02)

(58) Field of Classification Search
CPC . H04W 76/14; H04W 72/0446; H04W 76/15; H04W 72/20; H04L 5/0094; H04L 5/0098; H04L 5/0092; H04L 5/0053
See application file for complete search history.

(56) References Cited

U.S. PATENT DOCUMENTS

| | | | |
|---|---|---|---|
| 2019/0050370 A1 | 2/2019 | Parra Vilchis et al. | |
| 2022/0191862 A1* | 6/2022 | Hwang | H04W 72/0446 |
| 2023/0142228 A1* | 5/2023 | Ko | H04L 5/0092 |
| | | | 370/280 |

FOREIGN PATENT DOCUMENTS

| | | |
|---|---|---|
| CN | 109327906 A | 2/2019 |
| CN | 110536449 A | 12/2019 |

(Continued)

OTHER PUBLICATIONS

CATT: "Feature lead summary on AI 7.2.4.3 #2 Sidelink synchronization mechanism" 3GPP TSG RAN WG1 Meeting #100; R1-2000833; Mar. 6, 2020; e-Meeting (26 pages).

(Continued)

*Primary Examiner* — Syed Ali
*Assistant Examiner* — Najeeb Ansari
(74) *Attorney, Agent, or Firm* — Foley & Lardner LLP

(57) ABSTRACT

A system and method for indicating potential sidelink slots are disclosed herein. In some embodiments, a method performed by a first wireless communication device includes determining, by the first wireless communication device, a first number of bits N1 to indicate a first portion of a plurality of potential sidelink slots and/or a second number of bits N2 to indicate a second portion of a plurality of potential sidelink slots and providing, by the first wireless communication device to a second wireless communication device in the sidelink communication, the plurality of potential sidelink slots according to an arrangement of the first number of bits N1 and the second number of bits N2.

18 Claims, 6 Drawing Sheets

(56) References Cited

FOREIGN PATENT DOCUMENTS

| CN | 110771217 A | 2/2020 |
|---|---|---|
| CN | 110771224 A | 2/2020 |
| CN | 110831158 A | 2/2020 |
| WO | WO-2020/034320 A1 | 2/2020 |
| WO | WO-2020/034326 A1 | 2/2020 |

OTHER PUBLICATIONS

International Search Report and Written Opinion for PCT Appl. No. PCT/CN2020/084330 dated Jan. 4, 2021 (7 pages).
Nokia et al.: "Remaining details of sidelink Synchronization mechanism" 3GPP TSG-RAN WG1 Meeting #100-e; R1-2000385; Mar. 6, 2020; e-Meeting (15 pages).
First Office Action for CN Appl. No. 202080098661.6, dated Jul. 18, 2024 (with English translation, 13 pages).
Intel Corporation, "FI summary#2 of critical issues for 7.2.4.2.2—V2X Mode 2", 3GPP TSG RAN WG1 Meeting #100-E, R1-2001170, Mar. 6, 2020, e-Meeting (27 pages).
Huawei et al., "Remaining details of sidelink synchronization mechanisms", 3GPP TSG RAN WG1 Meeting #100-e, R1-2000185, Mar. 6, 2020 (14 pages).
Qualcomm Incorporated, "Synchronization Details for NR V2X", 3GPP TSG RAN WG1 #100-e, R1-2001198, Mar. 6, 2020 (10 pages).
Third Office Action for CN Appl. No. 202080098661.6, dated Mar. 1, 2025 (with English translation, 7 pages).

* cited by examiner

SYSTEM AND METHOD FOR SIDELINK SLOT INDICATION

CROSS-REFERENCE TO RELATED APPLICATION

This application claims the benefit of priority under 35 U.S.C. § 120 as a continuation of PCT Patent Application No. PCT/CN2020/084330, filed on Apr. 10, 2020, the disclosure of which is incorporated herein by reference in its entirety.

TECHNICAL FIELD

The disclosure relates generally to wireless communications and, more particularly, to systems and methods for V2X communication indicating potential sidelink slots.

BACKGROUND

Sidelink (SL) communication is a wireless radio communication directly between two or more user equipment devices (hereinafter "UE"). In this type of communication, two or more UEs that are geographically proximate to each other can directly communicate without going through an eNode or a base station (hereinafter "BS"), or a core network. Data transmission in sidelink communications is thus different from typical cellular network communications, which transmit data to a BS (i.e., uplink transmissions) or receive date from a BS (i.e., downlink transmissions). In sidelink communications, data is transmitted directly from a source UE to a target UE through the Unified Air Interface, e.g., PC5 interface, without passing through a BS In within network coverage, all UEs are within network coverage of the BS. In partial network coverage, at least one UE is within network coverage and at least another UE is outside of network coverage. In out of network coverage, all UEs are outside of network coverage.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a method performed by a first wireless communication device includes determining, by the first wireless communication device, a first number of bits N1 to indicate a first portion of a plurality of potential sidelink slots and/or a second number of bits N2 to indicate a second portion of a plurality of potential sidelink slots, and providing, by the first wireless communication device to a second wireless communication device in the sidelink communication, the plurality of potential sidelink slots according to an arrangement of the first number of bits N1 and/or the second number of bits N2.

In some embodiments, the method includes identifying, by the first wireless communication device, a first pattern and a second pattern collectively representing the plurality of potential sidelink slots. The first pattern has a first time period p1 and the second pattern having a second time period p2, in some embodiments. In some embodiments, the method includes determining, by the first wireless communication device based on a sub-carrier spacing u1 that is configured or preconfigured, a first number of potential sidelink slots S1 included in the first pattern and a second number of potential sidelink slots S2 included in the second pattern.

In some embodiments, a method performed by a second wireless communication device includes receiving, by a second wireless communication device from the first wireless communication device in sidelink communication, indication bits that indicate a plurality of potential sidelink slots and determining, by the second wireless communication device, a first number of bits N1 indicating the first portion of the plurality of potential sidelink slots and/or a second number of bits N2 indicating the second portion of the plurality of potential sidelink slots.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1A:
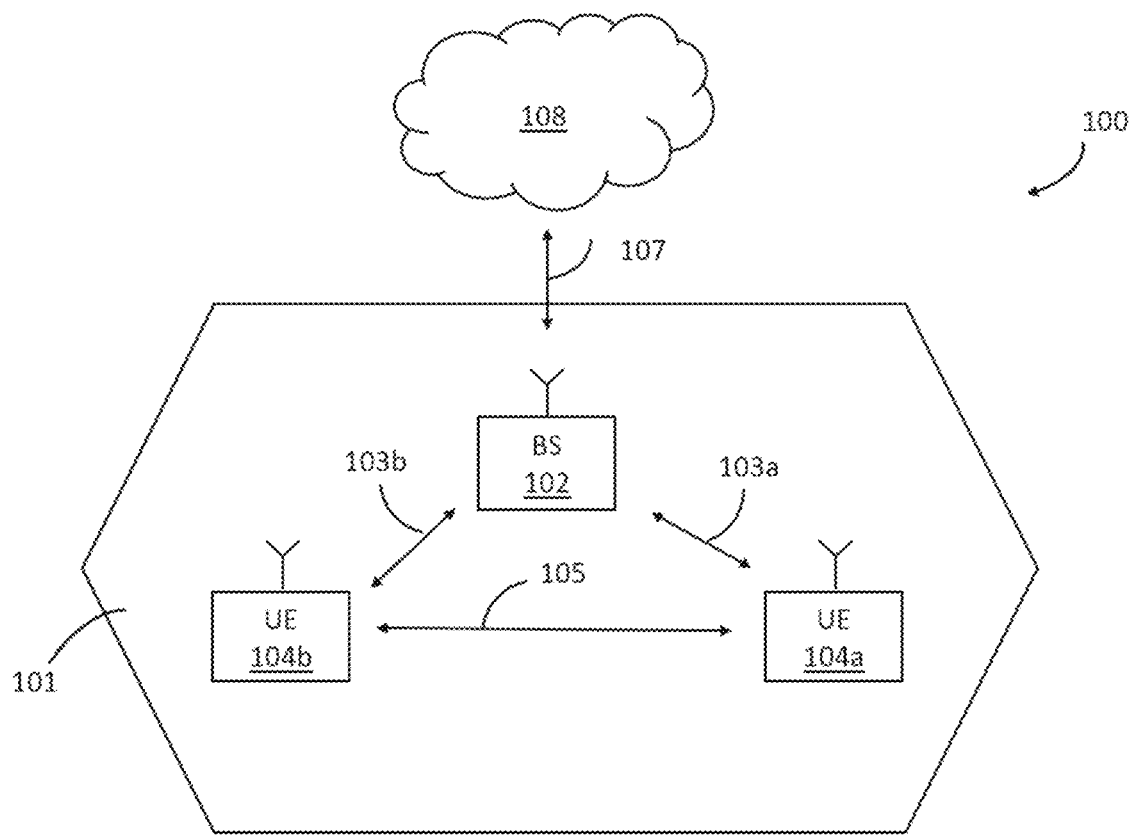
FIG. 1A illustrates an example wireless communication network, in accordance with an embodiment of the present disclosure.

Referring to FIG. 1A, an example wireless communication network 100 is shown. The wireless communication network 100 illustrates a group communication within a cellular network. In a wireless communication system, a network side communication node or a base station (BS) can include a next Generation Node B (gNB), an E-utran Node B (also known as Evolved Node B, eNodeB or eNB), a pico station, a femto station, a Transmission/Reception Point (TRP), an Access Point (AP), or the like. A terminal side node or a user equipment (UE) can include a long range communication system such as, for example, a mobile device, a smart phone, a personal digital assistant (PDA), a tablet, a laptop computer, or a short range communication system such as, for example a wearable device, a vehicle with a vehicular communication system, or the like. In FIG. 1A, a network side and a terminal side communication node are represented by a BS 102 and a UE 104a or 104b, respectively, and in the embodiments in this disclosure hereafter. In some embodiments, the BS 102 and UE 104a/104b are sometimes referred to as "wireless communication node" and "wireless communication device," respectively. Such communication nodes/devices can perform wireless and/or wired communications.

In the illustrated embodiment of FIG. 1A, the BS 102 can define a cell 101 in which the UEs 104a-b are located. The UE 104a can include a vehicle that is moving within a coverage of the cell 101. The UE 104a can communicate with the BS 102 via a communication channel 103a. Similarly, the UE 104b can communicate with the BS 102 via a communication channel 103b. In addition, the UEs 104a-b can communicate with each other via a communication channel 105. The communication channels (e.g., 103a-b) between the UE and the BS can be through interfaces such as an Uu interface, which is also known as UMTS (Universal Mobile Telecommunication System (UMTS)) air interface. The communication channels (e.g., 105) between the UEs can be through a PC5 interface, which is introduced to address high moving speed and high density applications such as, for example, Vehicle-to-Vehicle (V2V) communications, Vehicle-to-Pedestrian (V2P) communications, Vehicle-to-Infrastructure (V2I) communications, Vehicle-to-Network (V2N) communications, or the like. In some instances, such car network communications modes can be collective referred to as Vehicle-to-Everything (V2X) communications. It is appreciated that the communications channels between the UEs can be used in Device-to-Device (D2D) communications while remaining within the scope of the present disclosure. The BS 102 is connected to a core network (CN) 108 through an external interface 107, e.g., an Iu interface.

Figure 1B:
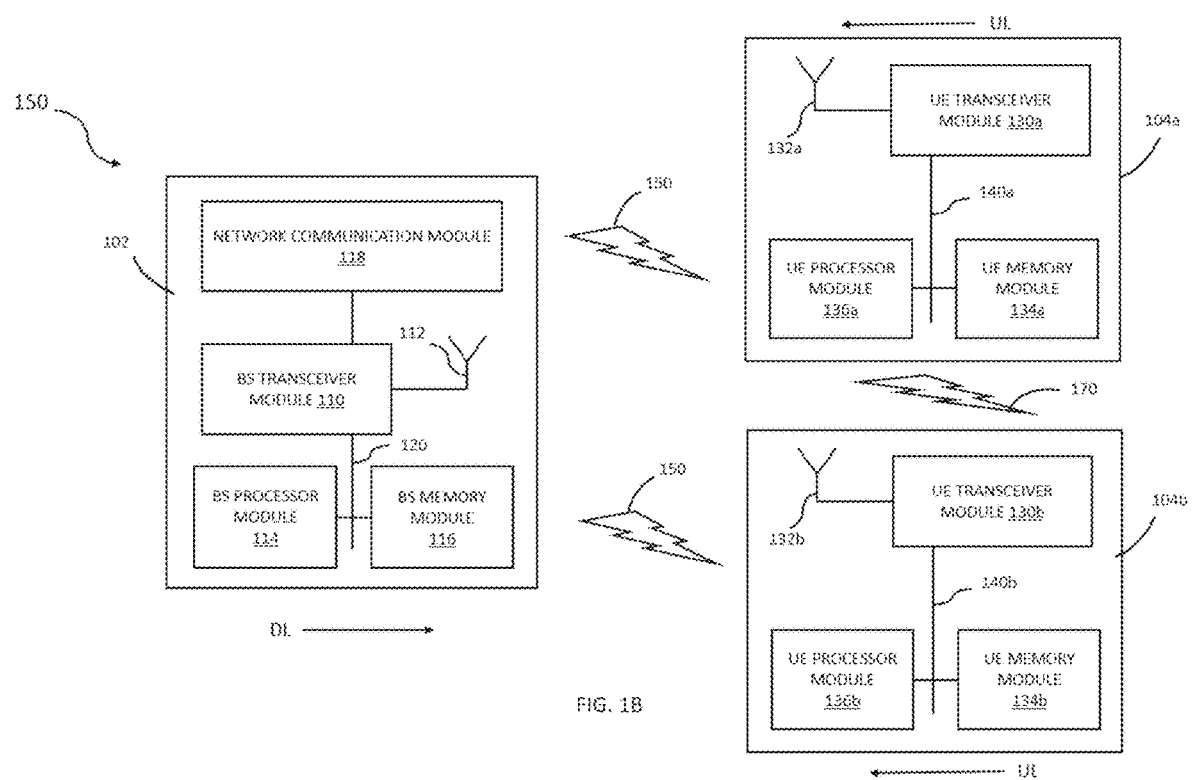
FIG. 1B illustrates a block diagram of an example wireless communication system for transmitting and receiving downlink, uplink, and/or sidelink communication signals, in accordance with some embodiments of the present disclosure.

FIG. 1B illustrates a block diagram of an example wireless communication system 150 for transmitting and receiving downlink, uplink and sidelink communication signals, in accordance with some embodiments of the present disclosure. The system 150 may include components and elements configured to support known or conventional operating features that need not be described in detail herein. In one embodiment, the system 150 can transmit and receive data symbols in a wireless communication environment such as the wireless communication network 100 of FIG. 1A, as described above.

The system 150 generally includes the BS 102 and UEs 104a-b, as described in FIG. 1A. The BS 102 includes a BS transceiver module 110, a BS antenna 112, a BS memory module 116, a BS processor module 114, and a network communication module 118, each module being coupled and interconnected with one another as necessary via a data communication bus 120. The UE 104a includes a UE transceiver module 130a, a UE antenna 132a, a UE memory module 134a, and a UE processor module 136a, each module being coupled and interconnected with one another as necessary via a data communication bus 140a. Similarly, the UE 104b includes a UE transceiver module 130b, a UE antenna 132b, a UE memory module 134b, and a UE processor module 136b, each module being coupled and interconnected with one another as necessary via a data communication bus 140b. The BS 102 communicates with the UEs 104a-b via one or more of a communication channel 150, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present disclosure.

A wireless transmission from an antenna of one of the UEs 104a-b to an antenna of the BS 102 is known as an uplink transmission, and a wireless transmission from an antenna of the BS 102 to an antenna of one of the UEs 104a-b is known as a downlink transmission. In accordance with some embodiments, each of the UE transceiver modules 130a-b may be referred to herein as an uplink transceiver, or UE transceiver. The uplink transceiver can include a transmitter and receiver circuitry that are each coupled to the respective antenna 132a-b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter and receiver circuitry that are each coupled to the antenna 112. A downlink duplex switch may alternatively couple the downlink transmitter or receiver to the antenna 112 in time duplex fashion. The operations of the transceivers 110 and 130a-b are coordinated in time such that the uplink receiver is coupled to the antenna 132*a-b* for reception of transmissions over the wireless communication channel 150 at the same time that the downlink transmitter is coupled to the antenna 112. In some embodiments, the UEs 104*a-b* can use the UE transceivers 130*a-b* through the respective antennas 132*a-b* to communicate with the BS 102 via the wireless communication channel 150. The wireless communication channel 150 can be any wireless channel or other medium known in the art suitable for downlink (DL) and/or uplink (UL) transmission of data as described herein. The UEs 104*a-b* can communicate with each other via a wireless communication channel 170. The wireless communication channel 170 can be any wireless channel or other medium known in the art suitable for sidelink transmission of data as described herein.

Each of the UE transceiver 130*a-b* and the BS transceiver 110 are configured to communicate via the wireless data communication channel 150, and cooperate with a suitably configured antenna arrangement that can support a particular wireless communication protocol and modulation scheme. In some embodiments, the UE transceiver 130*a-b* and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130*a-b* and the BS transceiver 110 may be configured to support alternate, or additional, wireless data communication protocols, including future standards or variations thereof.

The processor modules 136*a-b* and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 114 and 136*a-b*, respectively, or in any practical combination thereof. The memory modules 116 and 134*a-b* may be realized as RAM memory, flash memory, ROM memory, EPROM memory, EEPROM memory, registers, a hard disk, a removable disk, a CD-ROM, or any other form of storage medium known in the art. In this regard, the memory modules 116 and 134*a-b* may be coupled to the processor modules 114 and 136*a-b*, respectively, such that the processors modules 114 and 136*a-b* can read information from, and write information to, memory modules 116 and 134*a-b*, respectively. The memory modules 116 and 134*a-b* may also be integrated into their respective processor modules 114 and 136*a-b*. In some embodiments, the memory modules 116 and 134*a-b* may each include a cache memory for storing temporary variables or other intermediate information during execution of instructions to be executed by processor modules 114 and 136*a-b*, respectively. Memory modules 116 and 134*a-b* may also each include non-volatile memory for storing instructions to be executed by the processor modules 114 and 136*a-b*, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

In some embodiments, each of the UEs 104*a-b* can operate in a hybrid communication network in which the UE communicates with the BS 102, and with other UEs, e.g., between 104*a* and 104*b*. As described in further detail below, the UEs 104*a-b* support sidelink communications with other UE's as well as downlink/uplink communications between the BS 102 and the UEs 104*a-b*. In general, the sidelink communication allows the UEs 104*a-b* to establish a direct communication link with each other, or with other UEs from different cells, without requiring the BS 102 to relay data between UEs.

Out of coverage UEs are unable to derive TDD UL-DL configuration information since they cannot receive the configuration signal from network. Consequently, out of coverage UEs cannot know the frame structure in the shared carrier with cellular Uu link. And cannot know the location of sidelink resource pool. So, the out of coverage UEs cannot perform sidelink communication (e.g., V2X) with the in coverage UEs. By configuring and pre-configuring, TDD UL-DL configuration information can be aligned between out of coverage and in coverage. But this would restrict the configuration from network.

Figure 2:
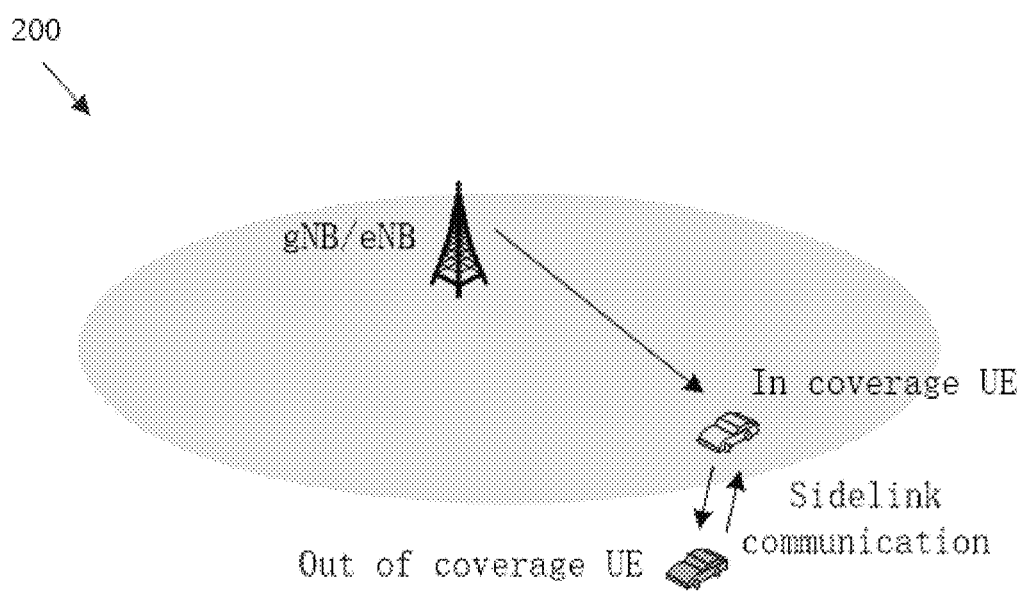
FIG. 2 illustrates an example wireless communication network, in accordance with some embodiments of the present disclosure.

Referring to FIG. 2, an example wireless communication network 200 is shown. The network 200 includes a gNB/eNB, an in coverage UE in communication with the gNB/eNB, and an out of coverage UE in sidelink communication with the in coverage UE. In some embodiments, the gNB/eNB is BS 102 with respect to FIG. 1A, the in coverage UE is one of UE 104*a* and 104*b* with respect to FIG. 1A, and the out of coverage UE is the other of UE 104*a* and 104*b* with respect to FIG. 1A, except that the out of coverage UE is not in communication with the gNB/eNB. The network 200 can be referred to as partial coverage. Partial coverage is a scenario in which both in coverage UEs and out of coverage UEs are included. In coverage UEs and out of coverage UEs can work (e.g., perform, communicate) in different carriers. For example, the out of coverage UEs can perform V2X communication in a dedicated carrier, e.g., a carrier in ITS (Intelligent Transport System) frequency and the in coverage UEs can perform V2X communication in a shared carrier, e.g., the carrier for Uu link. In coverage UEs and out of coverage UEs can work in same carriers, such as in dedicated carrier or shared carrier. When the in coverage UEs and the out of coverage UEs work in the same carrier, the frame structure information is same for the in coverage UEs and the out of coverage UEs. Otherwise, they may or may not perform V2X communication with each other successfully. If the out of coverage UEs perform V2X communication with the in coverage UEs in the shared carrier, they keep the frame structure aligned TDD UL-DL configuration information configured in coverage. They may or may not impact the cellular communication, e.g., UL transmission.

In LTE V2X, TDD UL-DL configuration information is carried in PSBCH (Physical Sidelink Broadcast Channel) to indicate the frame structure information of the shared carrier for the out of coverage UEs. A total 7 kinds of TDD UL-DL configurations are supported in LTE, such that 3 bits are enough to indicate the kind of TDD UL-DL configuration.

In NR system, TDD UL-SL configuration information includes a cell-specific frame structure configuration (e.g., tdd-UL-DL-ConfigurationCommon), a UE-specific frame structure configuration (e.g., tdd-UL-DL-Configuration-Dedicated) and a Group-common frame structure configuration (e.g., DCI format 2_0). In NR V2X, only the cell-specific frame structure configuration information is indicated in PSBCH.

Figure 3:
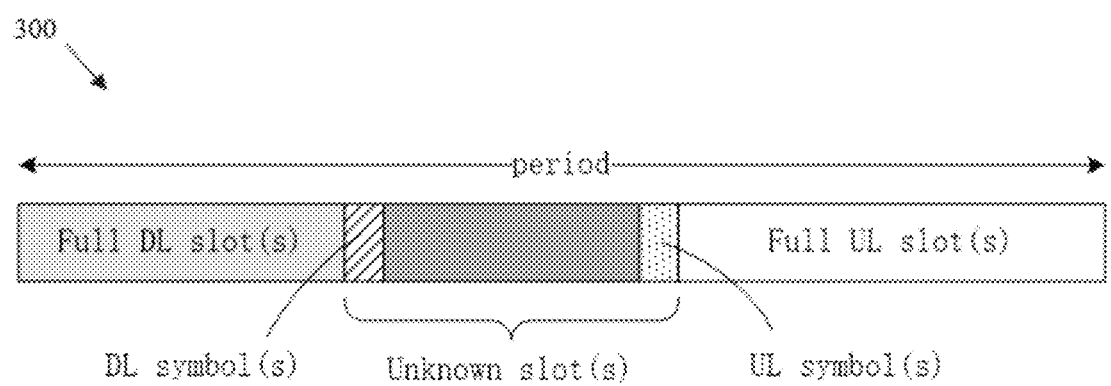
FIG. 3 illustrates an example diagram of a pattern, in accordance with some embodiments of the present disclosure.

Referring to FIG. 3, an example diagram of a pattern 300 is shown, in accordance with some embodiments. The configuration of tdd-UL-DL-ConfigurationCommon supports a one-DL-UL pattern configuration (e.g., a configuration having a pattern such as the pattern 300). As shown in FIG. 3, within the one-DL-UL pattern, at least one slot type of DL slot, Unknown slot, and UL slot may be configured. If all slot types are configured, an order of slot types is DL slot(s), Unknown slot(s), and UL slot(s). The first slot of Unknown slot(s) can include DL symbol(s), and the last slot of Unknown slot(s) can include UL symbol(s).

Figure 4:
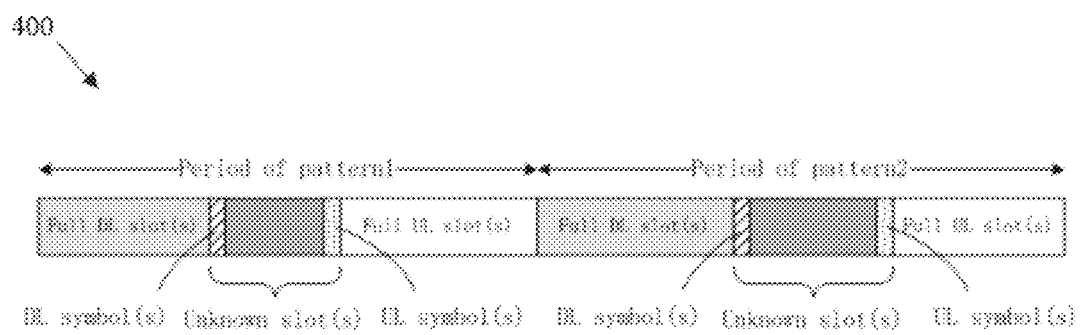
FIG. 4 illustrates an example diagram of two patterns, in accordance with some embodiments of the present disclosure.

Referring to FIG. 4, an example diagram of two patterns 400 is shown, in accordance with some embodiments. The configuration of tdd-UL-DL-ConfigurationCommon supports a two-DL-UL pattern configuration (e.g., a configuration having a two patterns such as the pattern 400). As shown in FIG. 4, if two one-DL-UL patterns are included in tdd-UL-DL-ConfigurationCommon configuration, the beginning of pattern2 is jointed to the end of pattern1. The combination of the two periods repeats within every 20 ms. The numbers of DL slot, Unknown slot, and UL slot can be different respectively between the two patterns.

In a DL-UL pattern, the contents need to be indicated to include at least a periodicity of the DL-UL pattern and potential sidelink slot(s) in the DL-UL pattern. The potential sidelink slot refers to a slot that can be used to sidelink resource pool mapping. If only one pattern (e.g., pattern1) is configured in tdd-UL-DL-ConfigurationCommon, a total 9 values of periodicity are need to supported. If two patterns (e.g., pattern1 and pattern2) are configured in tdd-UL-DL-ConfigurationCommon, a total 16 values of combinations of periodicity should be supported. Multiple sidelink SCSs (Sub-carrier Spacings) are supported in NR V2X. For 120 kHz, maximum potential sidelink slots can reach 80.

In NR V2X, the payload of PSBCH is limited to 32 bits without CRC. 12 bits indicate the cell-specific frame structure configuration information. When pattern1 and pattern2 are configured in tdd-UL-DL-ConfigurationCommon, 12 bits are not enough to indicate a maximum number of the potential sidelink slots, e.g., assuming 120 kHz for sidelink SCS and 10 ms for each periodicity. The frame structure information for the out of coverage UEs may be different with that of the in coverage UEs.

Embodiments of the present disclosure provides a V2X communication method which can indicate the cell-specific frame structure configuration information and keep the frame structure aligned between the in coverage UEs and the out of coverage UEs. The proposed V2X communication method can improve the stability of V2X communication. In the following description, systems and methods of potential sidelink slot indication is described based on the indication bits equal to N bits. In some embodiments, N=7.

One pattern or two patterns are configured in TDD UL-DL configuration (e.g., tdd-UL-DL-ConfigurationCommon). If only pattern1 is configured, the indication of a number of the potential sidelink slots in the DL-UL pattern of pattern1 is determined based on one pattern.

In some embodiments, a first wireless communication device (e.g., an in coverage UE) identifies a pattern representing the plurality of potential sidelink slots, the pattern having a time period. In some embodiments, the first wireless communication device determines, based on a sub-carrier spacing that is configured or preconfigured, a number of potential sidelink slots included in the pattern. In some embodiments, the first wireless communication device arranges, based on the number of potential sidelink slots, the first number of bits N1 (e.g., N=N1). In some embodiments, the first wireless communication device arranges, based on the first number of bits N1 and the total number of indication bits N, the second number of bits N2, wherein N=N1+N2.

In some embodiments, a second wireless communication device (e.g., an out of coverage UE) identifies a pattern representing the plurality of potential sidelink slots, the pattern having a time period. The second wireless communication device can determine, based on a sub-carrier spacing that is configured or preconfigured, a number of potential sidelink slots included in the pattern. In some embodiments, the second wireless communication device determines, based on the number of potential sidelink slots, the first number of bits N1 (e.g., N=N1). In some embodiments, the second wireless communication device can determine, based on the first number of bits N1 and the number of indication bits N, the second number of bits N2, wherein N=N1+N2.

If pattern1 and pattern2 are configured, the indication of numbers of the potential sidelink slots in the DL-UL patterns of pattern1 and pattern2 are determined based on two patterns.

A first wireless communication device (e.g., an in coverage UE) in sidelink communications determines a first number of bits N1 to indicate a first portion of a plurality of potential sidelink slots and a second number of bits N2 to indicate a second portion of the plurality of potential sidelink slots. The first wireless communication device provides, to a second wireless communication device (e.g., an out of coverage UE) in the sidelink communication, the plurality of potential sidelink slots according to an arrangement of at least one of the first number of bits N1 and the second number of bits N2. In some embodiments, if one of the first number of bits N1 and the second number of bits N2 is arranged, N bits are used, i.e., N=N1 or N=N2. If the first number of bits N1 and the second number of bits N2 are arranged, the sum of N1 and N2 equals to N. In some embodiments, the plurality of potential sidelink slots are indicated in a field of PSBCH (e.g., TDD-UL-DL-ConfigurationCommon message).

The second wireless communication device receives, from the first wireless communication device in sidelink communication, indication bits that indicate a plurality of potential sidelink slots. The second wireless communication device determines the first number of bits N1 indicating the first portion of the plurality of potential sidelink slots and the second number of bits N2 indicating the second portion of the plurality of potential sidelink slots.

In some embodiments, the maximum potential sidelink slots supported in DL-UL pattern are scaled by a scaling factor M, wherein M is a positive integer in a unit of slot or ms (millisecond). In some embodiments, X=L/M, wherein L is the maximum number of potential sidelink slots supported in DL-UL pattern based on a sub-carrier which is configured or pre-configured (e.g., SL SCS) and X is a value of the integer part of the potential sidelink slots supported in DL-UL pattern based on the granularity of M slots or M ms. N1 can indicate an index of the integer part or an index corresponding to the combination of the integer parts in pattern1 and pattern2. The index can be in the range of 0 to X−1.

For example, if the potential sidelink slots in pattern1 and pattern2 are L1 and L2 respectively, based on scaling factors M1 and M2 (M1 can equal to M2), scaled numbers of the potential sidelink slots in pattern1 and pattern2 can be derived by X1=L1/M1 and X2=L2/M2. In some embodiments, X1 and X2 are combined with an index in a table. The index can be indicated by N1 bits in PSBCH. The index can be in the range of 0 to X1*X2−1.

If N2 is larger than 0, N2 bits can indicate the fractional part based on the granularity of one slot. The fractional part refers to the slot(s) remained after the potential sidelink slot number are scaled by M1 or M2. For example, Y1=L1−X1*M1 and Y2=L2−X2*M2, wherein Y1 and Y2 are the values of the fractional part of the potential sidelink slots for pattern1 and pattern2. In some embodiments, the values of Y1 and Y2 are combined with an index in the configured or pre-configured table. N2 bits in PSBCH can indicate the index corresponding to the combination of Y1 and Y2. The index can be in the range of 0 to Y1*Y2−1.

For example, sidelink (SL) SCS=120 kHz, slot duration is 0.125 ms, and each of pattern1 of pattern2 are configured with periodicity 5 ms. It can be computed that L1=L2=40 (=5 ms/0.125 ms) is the maximum number of the potential sidelink slots supported for each. The potential number of the values of the combination of L1 and L2 is the product of L1 and L2, which is 1600 (40*40). If N=7, N bits can only indicate 128 values for the combination of L1 and L2.

If the number of slot is scaled by factor 8 (i.e., M1=M2=8), then L1=5 and L2=5. The maximum number of the combination of the integer part of the potential sidelink slot number is 25 (=5*5). Only N1=5 bits of the N bits are needed to indicate the combinations of the integer part of the potential sidelink slot number. If N=7, another N2=2 bits of the N bits can indicate the fractional part of the potential sidelink slot number. The 2 bits can indicate 4 combinations of the fractional part of potential sidelink slot number which are configured or pre-configured for two patterns. The example is shown as the following tables:

The number of integer part:

| index | Number of the integer part for Pattern1, x1 (*8slot) | Number of the integer part for Pattern2, x2 (* 8bit) | N1 (5 bit) |
|---|---|---|---|
| 0 | 0 | 0 | 0 |
| 1 | 0 | 1 | 1 |
| 2 | 0 | 2 | 2 |
| 3 | 0 | 3 | 3 |
| 4 | 0 | 4 | 4 |
| 5 | 1 | 0 | 5 |

-continued

| index | Number of the integer part for Pattern1, x1 (*8slot) | Number of the integer part for Pattern2, x2 (* 8bit) | N1 (5 bit) |
|---|---|---|---|
| 6 | 1 | 1 | 6 |
| 7 | 1 | 2 | 7 |
| ... | ... | ... | ... |
| 24 | 4 | 4 | 24 |

The number of fractional part:

| index | Number of the fractional part for Pattern1, y1 ( slot) | Number of the fractional part for Pattern2, y2 (slot) | N2 (2 bit) |
|---|---|---|---|
| 0 | 3 | 3 | 0 |
| 1 | 3 | 6 | 1 |
| 2 | 6 | 3 | 2 |
| 3 | 6 | 6 | 3 |

In some embodiments, the first wireless communication device identifies a first pattern and a second pattern collectively representing the plurality of potential sidelink slots. The first pattern has a first time period p1 and the second pattern having a second time period p2, in some embodiments. In some embodiments, the first wireless communication device determines, based on a sub-carrier spacing u1 (e.g., SL SCS) that is configured or preconfigured, a first number of potential sidelink slots S1 (e.g., L1) included in the first pattern and a second number of potential sidelink slots S2 (e.g., L2) included in the second pattern by the following:

$$S1=p1 \times 2^{u1} \text{ and } S2=p2 \times 2^{u1}$$

In some embodiments, the first number corresponds to a maximum number of potential sidelink slots available to be included in the first pattern, and the second number corresponds to a maximum number of potential sidelink slots available to be included in the second pattern.

In some embodiments, the first wireless communication device arranges, based on the first number of potential sidelink slots S1 and the second number of potential sidelink slots S2, the first number of bits N1 using the following relationships:

$$N1=\text{ceil}(\log_2(S1 \times S2))$$

In some embodiments, the first wireless communication device determines a reference sub-carrier spacing u0 (e.g., u). In some embodiments, the first wireless communication device arranges, based on the first number of potential sidelink slots S1, the second number of potential sidelink slots S2, the sub-carrier spacing u1 and the reference sub-carrier spacing u0, the first number of bits N1 using (e.g., at least one of) the following relationships:

$$N1=\text{ceil}(\log_2(S1 \times S2 \times 4^{(u0-u1)})) \text{ or } N1=\text{ceil}(\log_2(S1 \times 2^{(u0-u1)} \times S2 \times 2^{(u0-u1)}))$$

In some embodiments, the first wireless communication device arranges, based on the first number of bits N1 and a total number of indication bits N, the second number of bits N2, wherein the total number of indication bits N, which is a sum of N1 and N2, is predefined.

In some embodiments, the second wireless communication device identifies the first pattern and the second pattern collectively representing the plurality of potential sidelink slots. The first pattern can have a first time period p1 and the second pattern having a second time period p2. In some embodiments, the second wireless communication device determines, based on a sub-carrier spacing u1 (e.g., SL SCS) that is configured or preconfigured, a first number of potential sidelink slots S1 included in the first pattern and a second number of potential sidelink slots S2 included in the second pattern by following:

$$S1=p1\times 2^{u1} \text{ and } S2=p2\times 2^{u1}$$

In some embodiments, the second wireless communication device determines, based on the first number of potential sidelink slots S1 and the second number of potential sidelink slots S2, the first number of bits N1 using the following relationships:

$$N1=\mathrm{ceil}(\log_2(S1\times S2))$$

In some embodiments, the second wireless communication device determines a reference sub-carrier spacing u0. The second wireless communication device can determine, based on the first number of potential sidelink slots S1, the second number of potential sidelink slots S2, the sub-carrier spacing u1 and the reference sub-carrier spacing u0, the first number of bits N1 using (e.g., at least one of) the following relationships:

$$N1=\mathrm{ceil}(\log_2(S1\times S2\times 4^{(u0-u1)})) \text{ or } N1=\mathrm{ceil}(\log_2(S1\times 2^{(u0-u1)}\times S2\times 2^{(u0-u1)}))$$

In some embodiments, the second wireless communication device determines, based on the first number of bits N1 and a number of indication bits N, the second number of bits N2, wherein the number of indication bits N, which is a sum of N1 and N2, is predefined.

In some embodiments, a UE, e.g., an in coverage UE or an out of coverage UE, determines a reference SCS (ref-SCS) as a minimum of (a) a predetermined or configured or preconfigured SL-SCS (e.g., 120 kHz) and/or (b) a highest available SCS for indication of a potential sidelink slot number. In some embodiments, the highest available SCS is determined iteratively. For example, 120 kHz is explored as an available SCS. Using 120 kHz results in L1=L2=40, so that the combination of L1 and L2 is 1600. This is larger than 128, the number of indices that can be indicated, based on N=7. In the example, 60 kHz is explored next, and the number of indices (400) is still larger than the number of indices that can be indicated. In the example, 30 kHz is explored next, and the number of indices (100) is less than the number of indices that can be indicated. Thus, in the example, 30 kHz is the highest available SCS for indication and is selected as the reference SCS.

In some embodiments, a SCS factor (u) is associated with the ref-SCS. In some embodiments, the UE calculates (e.g., determines, identifies, looks up, etc.) u. In some embodiments, a mapping from ref-SCS to u is included in a table (e.g., a look-up table). In some embodiments, the mapping is predetermined or preconfigured. In some embodiments, the mapping includes:

| Ref-SCS | u |
| --- | --- |
| 15 kHz | 0 |
| 30 kHz | 1 |
| 60 kHz | 2 |
| 120 kHz | 3 |

In some embodiments, u0 is the factor associated with the current SL-SCS. In some embodiments, pattern1 has a first period P1, and pattern2 has a second period, P2. P1 and P2 can be in units of milliseconds (ms). In some embodiments, a non-negative integer number $n_k$ (e.g., nk) is solved for based on the following relationship:

$$2^{nk}\geq p1\times p2\times 4^u$$

In some embodiments, a first number of bits N1 is solved for based on the following relationship:

$$N1=\min\{nk\}$$

N2 can be solved based on N1 and N, which is a sum of N1 and N2. In some embodiments, N is fixed (e.g., N1+N2=7.) The following table is based on SL SCS=120 kHz and N1+N2=7:

| Double pattern index | Pattern1 (ms) | Pattern2 (ms) | Granularity SCS (ref-SCS) | N1 (bit) | N2 (bit) |
| --- | --- | --- | --- | --- | --- |
| 0 | 10 | 10 | min{SCS, 15 kHz} | 7 | 0 |
| 1 | 5 | 5 | min{SCS, 30 kHz} | 7 | 0 |
| 2 | 2 | 2 | min{SCS, 60 kHz} | 6 | 1 |
| 3 | 1 | 1 | min{SCS, 120 kHz} | 6 | 1 |
| 4 | 2 | 3 | min{SCS, 60 kHz} | 7 | 0 |
| 5 | 3 | 2 | min{SCS, 60 kHz} | 7 | 0 |
| 6 | 1 | 4 | min{SCS, 60 kHz} | 6 | 1 |
| 7 | 4 | 1 | min{SCS, 60 kHz} | 6 | 1 |
| 8 | 1 | 3 | min{SCS, 60 kHz} | 6 | 1 |
| 9 | 3 | 1 | min{SCS, 60 kHz} | 6 | 1 |
| 10 | 2.5 | 2.5 | min{SCS, 60 kHz} | 7 | 0 |
| 11 | 0.5 | 0.5 | min{SCS, 120 kHz} | 4 | 3 |
| 12 | 2 | 0.5 | min{SCS, 120 kHz} | 6 | 1 |
| 13 | 0.5 | 2 | min{SCS, 120 kHz} | 6 | 1 |
| 14 | 1.25 | 1.25 | min{SCS, 120 kHz} | 7 | 0 |
| 15 | 0.625 | 0.625 | min{SCS, 120 kHz} | 5 | 2 |

In some embodiments, the first wireless communication device determines a reference sub-carrier spacing. In some embodiments, the reference sub-carrier spacing is predetermined or configured or preconfigured. In some embodiments, the first wireless communication device arranges the first number of bits using the following relationships:

$$2^{nk}\geq p1\times p2\times 4^u \text{ and } N1=\min\{nk\}$$

where nk is a non-negative integer, N1 represents the first number of bit, p1 represents the first time period, p2 represents the second time period, and u represents a reference sub-carrier spacing factor. In some embodiments, the first wireless communication device arranges, based on the first number of bits N1 and the total number of indication bits N, the second number of bits N2, wherein the total number of indication bits N, which is a sum of N1 and N2, is predefined.

In some embodiments, the first wireless communication device determines a reference sub-carrier spacing u0 and a sub-carrier spacing u1. In some embodiments, the first wireless communication device scales, responsive to the determination, the first number of potential sidelink slots S1 and the second number of potential sidelink slots S2 based on the granularity of M slots, wherein:

$$M=2^{(u1-u0)}$$

In some embodiments, the first wireless communication device scales, responsive to the determination, the first number of potential sidelink slots S1 and the second number of potential sidelink slots S2 based on the granularity of M, wherein M is positive value, e.g., 1 ms (millisecond) or 10 slots.

In some embodiments, the first wireless communication device determines, based on the first number of potential sidelink slots S1, the second number of potential sidelink slots S2, the reference sub-carrier spacing u0 and the sub-carrier spacing u1, the scaled first number of potential sidelink slots S1' and the scaled second number of potential sidelink slots S2', wherein:

$$S1'=S1\times 2^{(u0-u1)} \text{ and } S2'=S2\times 2^{(u0-u1)}$$

In some embodiments, the first wireless communication arranges the first number of bits N1, based on the first number of potential sidelink slots S1, the second number of potential sidelink slots S2, the reference sub-carrier spacing u0 and the sub-carrier spacing u1, using (e.g., at least one of) the following relationships:

$$N1=\text{ceil}(\log_2(S1\times S2\times 4^{(u0-u1)})) \text{ or } N1=\text{ceil}(\log_2(S1\times 2^{(u0-u1)}\times S2\times 2^{(u0-u1)}))$$

or based on the scaled first number of potential sidelink slots S1' and the scaled second number of potential sidelink slots S2', using the following relationships:

$$N1=\text{ceil}(\log_2(S1'\times S2'))$$

In some embodiments, the first wireless communication arranges, based on the first number of bits N1 and a total number of indication bits N, the second number of bits N2, wherein the total number of indication bits N, which is a sum of N1 and N2, is predefined.

In some embodiments, the first wireless communication device determines, based on a sub-carrier spacing (e.g., SL SCS) that is configured or preconfigured, a first number of potential sidelink slots included in the first pattern and a second number of potential sidelink slots included in the second pattern. In some embodiments, the first wireless communication device scales, by reducing the sub-carrier spacing, the first number of potential sidelink slots and the second number of potential sidelink slots until a product of the scaled first number of sidelink slots and the scaled second number of potential sidelink slots does not exceed two to the power of the total number of indication bits so as to determine the reduced sub-carrier spacing as the reference sub-carrier spacing u (e.g., u0).

In some embodiments, the first wireless communication determines that either (a) the reference sub-carrier spacing u0 is configured or pre-configured per the first time period p1 and the second time period p2, (b) the reference sub-carrier spacing u0 is configured or pre-configured per the first time period p1 or per the second time period p2, (c) the reference sub-carrier spacing u0 is configured or pre-configured per the sub-carrier spacing u1, or (d) the reference sub-carrier spacing u0 is configured or pre-configured based on the combination of the sub-carrier spacing u1 and the first time period p1 and/or the second time period p2.

In some embodiments, the first wireless communication determines that either the reference sub-carrier spacing u0 is by:

$$u0=\min(u1,u2)$$

wherein u2 is the largest SCS which is supported with the first pattern and the second pattern, or the reference sub-carrier spacing u0 is by:

$$u0=\min(u1,u2)$$

wherein u2 is the largest sub-carrier spacing which is configured or pre-configured per the first time period p1 and/or per the second time period p2.

In some embodiments, the first wireless communication determines the second number of bits N2 according to configuration or pre-configuration. In some embodiments, the first wireless communication determines, based on the first number of bits N2 and a total number of indication bits N, the first number of bits N1, wherein the total number of indication bits N, which is a sum of N1 and N2, is predefined. In some embodiments, the first wireless communication determines that the reference sub-carrier spacing u0 is by:

$$u0=\min(u1,u2)$$

wherein u2 is the largest sub-carrier spacing which is supported for the first number of potential sidelink slots S1 and the second number of potential sidelink slots S2 that can be indicated by the first number of bits N1.

In some embodiments, the first wireless communication determines that the reference sub-carrier spacing u0 is by:

$$u0=\min(u1,u2)$$

wherein u2 is the largest sub-carrier spacing which is supported for the scaled first number of potential sidelink slots S1' and the scaled second number of potential sidelink slots S2' that can be indicated by the first number of bits N1.

In some embodiments, the first wireless communication device determines, based on a sub-carrier spacing that is configured or preconfigured, a first number of potential sidelink slots included in the first pattern and a second number of potential sidelink slots included in the second pattern. In some embodiments, the first wireless communication device determines that the sub-carrier spacing, which is configured or pre-configured for sidelink, is the reference sub-carrier spacing.

In some embodiments, the second wireless communication device determines the first time period, and the second time period, a reference sub-carrier spacing. In some embodiments, the second wireless communication device determines the first number of bits using the following relationships:

$$2^{nk}\geq p1\times p2\times 4^u \text{ and } N1=\min\{nk\}$$

where nk is a non-negative integer, N1 represents the first number of bit, p1 represents the first time period, p2 represents the second time period, and u represents a reference sub-carrier spacing factor. The second wireless communication device can determine, based on the first number of bits N1 and the number of indication bits N, the second number of bits N2, wherein the number of indication bits N, which is a sum of N1 and N2, is predefined.

In some embodiments, the second wireless communication device determines a reference sub-carrier spacing u0 and a sub-carrier spacing u1. In some embodiments, the second wireless communication device scales, responsive to the determination, the first number of potential sidelink slots S1 and the second number of potential sidelink slots S2 based on the granularity of M slots, wherein:

$$M=2^{(u1-u0)}$$

In some embodiments, the second wireless communication device scales, responsive to the determination, the first number of potential sidelink slots S1 and the second number of potential sidelink slots S2 based on the granularity of M, wherein M is positive value, e.g., 1 ms (millisecond) or 10 slots.

In some embodiments, the second wireless communication device determines, based on the first number of potential sidelink slots S1, the second number of potential sidelink slots S2, the reference sub-carrier spacing u0 and the sub-carrier spacing u1, the scaled first number of potential sidelink slots S1' and the scaled second number of potential sidelink slots S2', wherein:

$$S1'=S1\times 2^{(u0-u1)} \text{ and } S2'=S2\times 2^{(u0-u1)}$$

In some embodiments, the second wireless communication device determines the first number of bits N1, based on the first number of potential sidelink slots S1, the second number of potential sidelink slots S2, the reference sub-carrier spacing u0 and the sub-carrier spacing u1, using (e.g., at least one of) the following relationships:

$$N1=\text{ceil}(\log_2(S1 \times S2 \times 4^{(u0-u1)})) \text{ or } N1=\text{ceil}(\log_2(S1 \times 2^{(u0-u1)} \times S2 \times 2^{(u0-u1)}))$$

or based on the scaled first number of potential sidelink slots S1' and the scaled second number of potential sidelink slots S2', using the following relationships:

$$N1=\text{ceil}(\log_2(S1' \times S2'))$$

In some embodiments, the second wireless communication device determines, based on the first number of bits N1 and a number of indication bits N, the second number of bits N2, wherein the number of indication bits N, which is a sum of N1 and N2, is predefined.

In some embodiments, the second wireless communication device determines, based on a sub-carrier spacing that is configured or preconfigured, a first number of potential sidelink slots included in the first pattern and a second number of potential sidelink slots included in the second pattern. In some embodiments, the second wireless communication device scales, by reducing the sub-carrier spacing, the first number of potential sidelink slots and the second number of potential sidelink slots until a product of the scaled first number of sidelink slots and the scaled second number of potential sidelink slots does not exceed two to the power of the number of indication bits so as to determine the reduced sub-carrier spacing as the reference sub-carrier spacing u.

In some embodiments, the second wireless communication device determines that either (a) the reference sub-carrier spacing u0 is configured or pre-configured per the first time period p1 and the second time period p2, (b) the reference sub-carrier spacing u0 is configured or pre-configured per the first time period p1 or per the second time period p2, (c) the reference sub-carrier spacing u0 is configured or pre-configured per the sub-carrier spacing u1, or (d) the reference u0 is configured or pre-configured based on the combination of the sub-carrier spacing u1 and the first time period sub-carrier spacing p1 and/or the second time period p2.

In some embodiments, the second wireless communication device determines that either the reference sub-carrier spacing u0 is by:

$$u0=\min(u1,u2)$$

wherein u2 is the largest SCS which is supported with the first pattern and the second pattern, or the reference sub-carrier spacing u0 is by:

$$u0=\min(u1,u2),$$

wherein u2 is the largest sub-carrier spacing which is configured or pre-configured per the first time period p1 and/or per the second time period p2.

In some embodiments, the second wireless communication device determines the second number of bits N2 according to configuration or pre-configuration. In some embodiments, the second wireless communication device determines, based on the first number of bits N2 and the number of indication bits N, the first number of bits N1, wherein the number of indication bits N, which is a sum of N1 and N2, is predefined. In some embodiments, the second wireless communication device determines that the reference sub-carrier spacing u0 is by:

$$u0=\min(u1,u2),$$

wherein u2 is the largest sub-carrier spacing which is supported for the first number of potential sidelink slots S1 and the second number of potential sidelink slots S2 that can be indicated by the first number of bits N1.

In some embodiments, the first wireless communication determines that the reference sub-carrier spacing u0 is by:

$$u0=\min(u1,u2)$$

wherein u2 is the largest sub-carrier spacing which is supported for the scaled first number of potential sidelink slots S1' and the scaled second number of potential sidelink slots S2' that can be indicated by the first number of bits N1.

In some embodiments, the second wireless communication device determines, based on a sub-carrier spacing that is configured or preconfigured, a first number of potential sidelink slots included in the first pattern and a second number of potential sidelink slots included in the second pattern. In some embodiments, the second wireless communication device determines that the sub-carrier spacing, which is configured or pre-configured for sidelink, is the reference sub-carrier spacing.

In some embodiments, N2 is determined according to configuration or pre-configuration. In some embodiments, N1 is solved based on N and N2. In some embodiments, a non-negative integer number uk (e.g., uk) is solved based on the following relationship:

$$2^{N1} \geq p1 \times p2 \times 4^{uk}$$

In some embodiments, a reference SCS factor u is solved based on the following relationship $$u=\max\{uk\}$$

In some embodiments, the UE (e.g., in coverage UE or out of coverage UE) determines a ref-SCS based on u. In some embodiments, a mapping from u to ref-SCS is included in a table (e.g., a look-up table). In some embodiments, the mapping is predetermined or preconfigured. In some embodiments, the mapping includes:

| u | Ref-SCS |
|---|---|
| 0 | 15 kHz |
| 1 | 30 kHz |
| 2 | 60 kHz |
| 3 | 120 kHz |

In some embodiments, the UE (e.g., in coverage UE or out of coverage UE) determines a ref-SC S based on Uk. In some embodiments, a mapping from Uk to ref-SCS is included in a table (e.g., a look-up table). In some embodiments, the mapping is predetermined or preconfigured. In some embodiments, the mapping includes:

| $u_k$ | Ref-SCS |
|---|---|
| 0 | 15 kHz |
| 1 | 30 kHz |
| 2 | 60 kHz |
| 3 | 120 kHz |

In some embodiments, the first wireless communication device arranges the second number of bits that is configured or preconfigured. In some embodiments, the first wireless communication device arranges, based on the second number of bits and the total number of indication bits, the first number of bits. In some embodiments, the first wireless communication device identifies a first pattern and a second pattern collectively representing the plurality of potential sidelink slots. The first pattern can have a first time period and the second pattern can have a second time period. In some embodiments, the first wireless communication device calculates a reference sub-carrier spacing factor using the following relationships:

$$2^{N1} \geq p1 \times p2 \times 4^{uk} \text{ and } u=\max\{uk\}$$

where N1 represents the first number of bit, in some embodiments, N1 is equal to the total number indication bits N, p1 represents the first time period, p2 represents the second time period, uk is a non-negative integer, and u represents the reference sub-carrier spacing factor. In some embodiments, the first wireless communication device determines a reference sub-carrier spacing.

In some embodiments, the second wireless communication device identifying, by the second wireless communication device, the second number of bits that is configured or preconfigured. The second wireless communication device can determine, based on the second number of bits and the number of indication bits, the first number of bits. In some embodiments, the second wireless communication device identifies a first pattern and a second pattern collectively representing the plurality of potential sidelink slots. The first pattern can have a first time period and the second pattern can have a second time period. The second wireless communication device can calculate a reference sub-carrier spacing factor using the following relationships:

$$2^{N1} \geq p1 \times p2 \times 4^{uk} \text{ and } u=\max\{uk\}$$

where N1 represents the first number of bit, in some embodiments, N1 is equal to the total number indication bits N, p1 represents the first time period, p2 represents the second time period, uk is a non-negative integer, and u represents the reference sub-carrier spacing factor. In some embodiments, the second wireless communication device determines, based on the reference sub-carrier spacing factor, a reference sub-carrier spacing.

Figure 5:
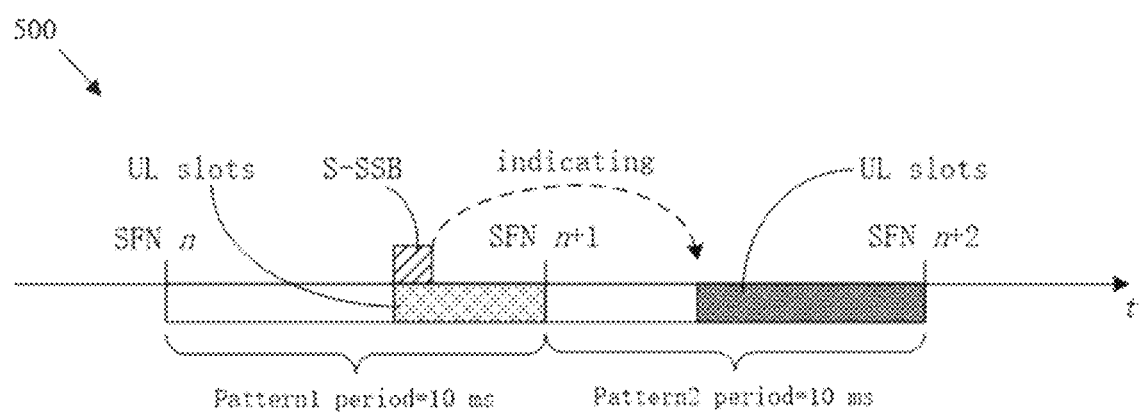
FIG. 5 illustrates an example diagram of two patterns, in accordance with some embodiments of the present disclosure.

Referring now to FIG. 5, an example diagram of two patterns 500 is shown, in accordance to some embodiments. In some embodiments, a UE (e.g., in coverage UE or out of coverage UE) determines the first slot location of the potential sidelink slot(s) in pattern1 or pattern2 according to the slot location where sidelink synchronization signal and/or physical broadcast channel block (S-SSB) is transmitted. The slot location for S-SSB transmission can be determined according to the system frame number (SFN) or direct frame number (DFN) and the slot index within SFN or DFN. In some embodiments, the index of the SFN or DFN, which can be referred to as $n_{DFN}$, and the slot index within SFN or DFN, which can be referred to as $n_{slot}$, are determined by configuration or pre-configuration, or by indication in S-SSB or PSBCH. The UE can determine, based on a sub-carrier spacing which is configured or pre-configured, that the location of slot for S-SSB or PSBCH transmission belongs to (e.g., falls within, is associated with, etc.) the range of pattern1 or pattern2. If $n_{DFN}$ is even, then $$x=(n_{slot}+1) \bmod (p1 \times 2^u + p2 \times 2^u)$$

where p1 and p2 are the values of the periods of pattern1 and pattern2 respectively. In some embodiments, u is the sub-carrier spacing factor corresponding to the sub-carrier spacing configured or pre-configured. In some embodiments, if $$x \leq p1 \times 2^u$$

then the slot location for S-SSB transmission belongs to the range of pattern1. Otherwise, in some embodiments, the slot location for S-SSB transmission belongs to the range of pattern2. If $n_{DFN}$ is odd, then $$x=(n_{slot}+1+10 \times 2^u) \bmod (p1 \times 2^u + p2 \times 2^u)$$

In some embodiments, if $$x \leq p1 \times 2^u$$

then the slot location for S-SSB transmission belongs to the range of pattern1. Otherwise, in some embodiments, the slot location for S-SSB transmission belongs to the range of pattern2. In some embodiments, if the slot location for S-SSB transmission belongs to the range of pattern1, the index of the first slot of potential sidelink slot(s) in pattern1 equals to $n_{slot}$−N, where N is non negative integer, which is predetermined or configured or preconfigured, and refers to the offset between the slot for S-SSB transmission and the first slot of potential sidelink slot(s). In some embodiments, the UE can determine, based on the index of the first slot of potential sidelink slot(s) in pattern1 and the period of pattern1 and/or the sub-carrier spacing configured or pre-configured (e.g., SL SCS), the number of potential sidelink slot(s) in pattern1. The number of potential sidelink slot(s) in pattern2 can be determined according to the indication in PSBCH or S-SSB. The method is same if the slot location for S-SSB transmission belongs to the range of pattern2.

In some embodiments, the number of potential SL slots in pattern1 and/or the number of potential SL slot in pattern2 are determined based on SL SCS which is configured or preconfigured. The first available SL slot is determined based on the configured or pre-configured Ref-SCS which is used as scaling granularity, in some embodiments. The values of N1 and N2 can be determined based on the number of the first available SL slot.

In some embodiments, the first number of bits N1 is determined using the following relationships:

$$2^{nk} \geq p1 \times p2 \times 4^u \text{ and } N1=\min\{nk\}$$

where nk is a non-negative integer, N1 represents the first number of bit, p1 represents the first time period, p2 represents the second time period, and u represents the reference sub-carrier spacing factor corresponding to Ref-SCS. In some embodiments, the second number of bits, based on the first number of bits and the total number of indication bits, can be determined.

In some embodiments, the first wireless communication device identifies a first pattern and a second pattern collectively representing the plurality of potential sidelink slots. The first pattern can have a first time period and the second pattern can have a second time period. In some embodiments, the first wireless communication device identifies a reference sub-carrier spacing that is configured or preconfigured. In some embodiments, the first wireless communication device calculates, based on the reference sub-carrier spacing, a reference sub-carrier spacing factor. In some embodiments, the first wireless communication device arranges the first number of bits using the following relationships:

$$2^{nk} \geq p1 \times p2 \times 4^u \text{ and } N1=\min\{nk\}$$

where nk is a non-negative integer, N1 represents the first number of bit, p1 represents the first time period, p2 represents the second time period, and u represents the reference sub-carrier spacing factor. In some embodiments, the first wireless communication device arranges, based on the first number of bits and the total number of indication bits, the second number of bits.

In some embodiments, the second wireless communication device identifies a first pattern and a second pattern collectively representing the plurality of potential sidelink slots, the first pattern having a first time period and the second pattern having a second time period. The second wireless device can identify a reference sub-carrier spacing that is configured or preconfigured. In some embodiments, the second wireless communication device calculates, based on the reference sub-carrier spacing, a reference sub-carrier spacing factor. The second wireless device can determine the first number of bits using the following relationships:

$$2^{nk} \geq p1 \times p2 \times 4^u \text{ and } N1 = \min\{nk\}$$

where nk is a non-negative integer, N1 represents the first number of bit, p1 represents the first time period, p2 represents the second time period, and u represents the reference sub-carrier spacing factor; and In some embodiments, the second wireless communication device determines, based on the first number of bits and the number of indication bits, the second number of bits.

In some embodiments, the first number of bits can be determined following relationships:

$$2^Z < N_{slot1} \times N_{slot2} \leq 2^{ni} \text{ and } n = \min(n_i)$$

Where ni is a non-negative integer, $N_{slot1}$ and $N_{slot2}$ are the maximum number of potential sidelink slots for a period of pattern1 (P1) and pattern2 (P2) respectively based on sidelink SCS which is configured or pre-configured. In some embodiments, it is assumed that $N_{slot1} \times N_{slot2} \leq 2048$ and Z=7. In some embodiments, if n is even, the scaling granularity equals to n/2. The unit at least includes slot. The first number of bits N1 is equal to n/2; and In some embodiments, the second number of bits N2 can be determined, based on the first number of bits and the number of indication bits. For example, N2 is equal to (Z−n/2).

In some embodiments, if n is odd, the scaling granularity equals to $\lfloor n/2 \rfloor$. The unit at least includes slot. The first number of bits N1 is equal to ($\lfloor n/2 \rfloor$+1); and In some embodiments, the second number of bits N2 can be determined, based on the first number of bits and the number of indication bits. For example, N2 is equal to (Z−($\lfloor n/2 \rfloor$+1)).

In some embodiments, the way of indication by the second number of bits N2 include at least indicating the index corresponding to the sot number(s) in the fractional part of the potential sidelink slots.

For example, the time period of pattern1 (P1) and the period of pattern2 (P2) are both 2.5 ms. The sidelink SCS is 120 kHz. Thus the $N_{slot1} * N_{slot2} = 20 * 20 = 400$ (slots). Assuming Z=7, then $2^Z < N_{slot1} \times N_{slot2}$ is met. For $N_{slot1} \times N_{slot2} \leq 2^{ni}$, $\min\{n_i\} = 9$, i.e., n=9. Since n (i.e., 9) is odd, the scaling granularity equals to $\lfloor n/2 \rfloor$ which is 4 slots. ($\lfloor n/2 \rfloor$+1)=5 bits, and (Z−($\lfloor n/2 \rfloor$+1))=2 bits. That is to say, the maximum number of potential sidelink slots in a period in pattern1 and pattern2 are scalded by unit of 4 slots. After scaled, the maximum number of integer part of the potential sidelink slots in a period of pattern1 and pattern2 based on scaling granularity are both 5. The possible combinations of the number of integer part of the potential sidelink slots in pattern1 and pattern2 are 5*5=25, e.g., the combination of 10 slots and 15 slots, which can be indicated by 5 bits. 2 bits are remained to indicate the potential sidelink slots in pattern1 and pattern2 after scaled. 2 bits can indicate 4 combinations of the potential sidelink slots, the combination of 1 slot and 2 slots, which can be configured and pre-configured and indicate by 2 bits.

In some embodiments, the first number of bits can be determined following relationships:

$$2^Z < N_{slot1} \times N_{slot2} \leq 2^{ni} \text{ and } n = \min(n_i)$$

where ni is a non-negative integer, $N_{slot1}$ and $N_{slot2}$ are the maximum number of potential sidelink slots for a period of pattern1 (P1) and pattern2 (P2) respectively based on sidelink SCS which is configured or pre-configured. In some embodiments, it is assumed that $N_{slot1} \times N_{slot2} \leq 2048$ and Z=7.

In some embodiments, the scaling granularity equals to n−6. The unit at least includes slot. The first number of bits N1 is equal to n/2.

In some embodiments, the second number of bits N2 can be determined, based on the first number of bits and the number of indication bits. For example, N2 is equal to (Z−6).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization. Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
determining, by a first wireless communication device comprising an in-coverage wireless communication device, a first pattern and a second pattern collectively representing a plurality of potential sidelink slots, the first pattern having a first time period p1 and the second pattern having a second time period p2;
determining, by the first wireless communication device based on a sub-carrier spacing u1 that is configured or preconfigured, a first number of potential sidelink slots S1 included in the first pattern and a second number of potential sidelink slots S2 included in the second pattern by the following:

$$S1=p1\times 2^{u1} \text{ and } S2=p2\times 2^{u1};$$

determining, by the first wireless communication device based on the first pattern and second pattern, a first number of bits N1 to indicate a first portion of the plurality of sidelink slots in a sidelink communication or a second number of bits N2 to indicate a second portion of the plurality of sidelink slots in the sidelink communication; and
providing, by the first wireless communication device to a second wireless communication device in the sidelink communication, a configuration indicating the plurality of potential sidelink slots, according to an arrangement of at least one of the first number of bits N1 or the second number of bits N2 in the configuration, the second wireless communication device comprising an out-of-coverage wireless communication device.

2. The wireless communication method of claim 1, further comprising:
arranging, by the first wireless communication device based on the first number of potential sidelink slots S1 and the second number of potential sidelink slots S2, the first number of bits N1 using following relationship:

$$N1=\text{ceil}(\log_2(S1 \times S2)).$$

3. The wireless communication method of claim 1, further comprising:
determining, by the first wireless communication device, a reference sub-carrier spacing u0;
arranging, by the first wireless communication device based on the first number of potential sidelink slots S1, the second number of potential sidelink slots S2, the sub-carrier spacing u1 and the reference sub-carrier spacing u0, the first number of bits N1 using following relationship:

$$N1=\text{ceil}(\log_2(S1 \times S2 \times 4^{(u0-u1)})) \text{ or}$$

$$N1=\text{ceil}(\log_2(S1 \times 2^{(u0-u1)} \times S2 \times 2^{(u0-u1)}); \text{ and}$$

arranging, by the first wireless communication device based on the first number of bits N1 and a total number of indication bits N, the second number of bits N2, wherein the total number of indication bits N, which is a sum of N1 and N2, is predefined.

4. The wireless communication method of claim 1, further comprising:
determining, by the first wireless communication device, a reference sub-carrier spacing;
arranging, by the first wireless communication device, the first number of bits N1 using following relationship:

$$2^{nk} \geq p1 \times p2 \times 4^u \text{ and } N1 = \min\{nk\}$$

where nk is a non-negative integer, N1 represents the first number of bits, p1 represents the first time period, p2 represents the second time period, and u represents a reference sub-carrier spacing factor; and
arranging, by the first wireless communication device based on the first number of bits N1 and a total number of indication bits N, the second number of bits N2, wherein the total number of indication bits N, which is a sum of N1 and N2, is predefined.

5. The wireless communication method of claim 1, further comprising:
determining, by the first wireless communication device, a reference sub-carrier spacing u0 and the reference sub-carrier spacing u1;
scaling, by the first wireless communication device responsive to the determination, the first number of potential sidelink slots S1 and the second number of potential sidelink slots S2 based on a granularity of M slots, wherein:

$$M = 2^{(u1-u0)};$$

determining, by the first wireless communication device, the scaled first number of potential sidelink slots S1' and the scaled second number of potential sidelink slots S2', wherein:

$$S1' = S1 \times 2^{(u0-u1)} \text{ and } S2' = S2 \times 2^{(u0-u1)}.$$

6. The wireless communication method of claim 4, wherein determining a reference sub-carrier spacing further comprises:
scaling, by the first wireless communication device by reducing the sub-carrier spacing u1, the first number of potential sidelink slots S1 and the second number of potential sidelink slots S2 until a product of the scaled first number of sidelink slots and the scaled second number of potential sidelink slots does not exceed two to the power of the total number of indication bits so as to determine the reduced sub-carrier spacing as the reference sub-carrier spacing u.

7. The wireless communication method of claim 5, wherein determining a reference sub-carrier spacing further comprises:
determining, by the first wireless communication device, that the reference sub-carrier spacing u0 is configured or pre-configured per the first time period p1 and the second time period p2; or
determining, by the first wireless communication device, that the reference sub-carrier spacing u0 is configured or pre-configured per the first time period p1 or per the second time period p2; or
determining, by the first wireless communication device, that the reference sub-carrier spacing u0 is configured or pre-configured per the sub-carrier spacing u1; or
determining, by the first wireless communication device, that the reference sub-carrier spacing u0 is configured or pre-configured based on the combination of the sub-carrier spacing u1 and the first time period p1 and/or the second time period p2.

8. The wireless communication method of claim 5, wherein determining a reference sub-carrier spacing further comprises:
determining, by the first wireless communication device, that the reference sub-carrier spacing u0 is by:

$$u0 = \min(u1, u2),$$

wherein u2 is the largest SCS which is supported with the first pattern and the second pattern; or
determining, by the first wireless communication device, that the reference sub-carrier spacing 20 is by:

$$u0 = \min(u1, u2),$$

wherein u2 is the largest sub-carrier spacing which is configured or pre-configured per the first time period p1 and/or per the second time period p2.

9. The wireless communication method of claim 5, wherein determining a reference sub-carrier spacing further comprises:
determining, by the first wireless communication device, the second number of bits N2 according to configuration or pre-configuration;
determining, by the first wireless communication device, based on the first number of bits N2 and a total number of indication bits N, the first number of bits N1, wherein the total number of indication bits N, which is a sum of N1 and N2, is predefined;
determining, by the first wireless communication device, that the reference sub-carrier spacing u0 is by:

$$u0 = \min(u1, u2),$$

wherein u2 is the largest sub-carrier spacing which is supported for the first number of potential sidelink slots S1 and the second number of potential sidelink slots S2 that can be indicated by the first number of bits N1.

10. The wireless communication method of claim 4, wherein determining a reference sub-carrier spacing further comprises:
determining, by the first wireless communication device, that the sub-carrier spacing, which is configured or pre-configured for sidelink, is the reference sub-carrier spacing.

11. The wireless communication method of claim 1, further comprising:
arranging, by the first wireless communication device, the second number of bits N2 that is configured or preconfigured;
arranging, by the first wireless communication device based on the second number of bits N2 and a total number of indication bits N, the first number of bits N1;
identifying, by the first wireless communication device, the first pattern and the second pattern collectively representing the plurality of potential sidelink slots;
calculating, by the first wireless communication device, a reference sub-carrier spacing factor using following relationship:

$$2^{N1} \geq p1 \times p2 \times 4^{uk} \text{ and } u = \max\{uk\}$$

where N1 represents the first number of bits, p1 represents the first time period, p2 represents the second time period, uk is a non-negative integer, and u represents the reference sub-carrier spacing factor; and
determining, by the first wireless communication device, a reference sub-carrier spacing.

12. The wireless communication method of claim 1, further comprising:
- identifying, by the first wireless communication device, a reference sub-carrier spacing that is configured or pre-configured;
- calculating, by the first wireless communication device, based on the reference sub-carrier spacing, a reference sub-carrier spacing factor;
- arranging, by the first wireless communication device, the first number of bits N1 using following relationship:

$$2^{nk} \geq p1 \times p2 \times 4^u \text{ and } N1 = \min\{nk\}$$

where nk is a non-negative integer, N1 represents the first number of bits, p1 represents the first time period, p2 represents the second time period, and u represents the reference sub-carrier spacing factor; and
- arranging, by the first wireless communication device based on the first number of bits N1 and a total number of indication bits N, the second number of bits N2.

13. The wireless communication method of claim 1, wherein the plurality of potential sidelink slots are indicated in a field of PSBCH.

14. The wireless communication method of claim 1, further comprising:
- determining, by the first wireless communication device based on the sub-carrier spacing that is configured or preconfigured, a number of potential sidelink slots;
- arranging, by the first wireless communication device based on the number of potential sidelink slots, the first number of bits N1; and
- arranging, by the first wireless communication device based on the first number of bits N1 and a total number of indication bits N, the second number of bits N2.

15. The wireless communication method of claim 6, wherein the first number of potential sidelink slots corresponds to a maximum number of potential sidelink slots available to be included in the first pattern, and the second number of potential sidelink slots corresponds to a maximum number of potential sidelink slots available to be included in the second pattern.

16. A wireless communication method, comprising:
- receiving, by a second wireless communication device comprising an out-of-coverage wireless communication device, from a first wireless communication device comprising an in-coverage wireless communication device, in sidelink communication, a configuration including indication bits that indicate a plurality of potential sidelink slots, the indication bits indicating the plurality of potential sidelink slots according to an arrangement of at least one of a first number of bits N1 and a second number of bits N2;
- identifying, by the second wireless communication device, a first pattern and a second pattern collectively representing the plurality of potential sidelink slots, the first pattern having a first time period p1 and the second pattern having a second time period p2;
- determining, by the second wireless communication device based on a sub-carrier spacing u1 that is configured or preconfigured, a first number of potential sidelink slots S1 included in the first pattern and a second number of potential sidelink slots S2 included in the second pattern by following:

$$S1 = p1 \times 2^{u1} \text{ and } S2 = p2 \times 2^{u1}; \text{ and}$$

- determining, by the second wireless communication device, the first number of bits N1 indicating a first portion of the plurality of potential sidelink slots and the second number of bits N2 indicating a second portion of the plurality of potential sidelink slots.

17. A first wireless communication device, comprising an in-coverage wireless communication device, the first wireless communication device comprising:
- at least one processor configured to:
  - determine a first pattern and a second pattern collectively representing a plurality of potential sidelink slots, the first pattern having a first time period p1 and the second pattern having a second time period p2;
  - determining, by the first wireless communication device based on a sub-carrier spacing u1 that is configured or preconfigured, a first number of potential sidelink slots S1 included in the first pattern and a second number of potential sidelink slots S2 included in the second pattern by the following:

$$S1 = p1 \times 2^{u1} \text{ and } S2 = p2 \times 2^{u1};$$

- determine, based on the first pattern and the second pattern, a first number of bits N1 to indicate a first portion of the plurality of sidelink slots in a sidelink communication or a second number of bits N2 to indicate a second portion of the plurality of sidelink slots in the sidelink communication; and
  - provide, via a transmitter to a second wireless communication device in sidelink communication, a configuration indicating the plurality of potential sidelink slots, according to an arrangement of at least one of the first number of bits N1 or the second number of bits N2 in the configuration, the second wireless communication device comprising an out-of-coverage wireless communication device.

18. A second wireless communication device comprising an out-of-coverage wireless communication device, the second wireless communication device comprising:
- at least one processor configured to:
  - receive, via a receiver from a first wireless communication device comprising an in-coverage wireless communication device, in sidelink communication, a configuration including indication bits that indicate a plurality of potential sidelink slots, the indication bits indicating the plurality of potential sidelink slots according to an arrangement of at least one of a first number of bits N1 and a second number of bits N2;
  - identify a first pattern and a second pattern collectively representing the plurality of potential sidelink slots, the first pattern having a first time period p1 and the second pattern having a second time period p2;
  - determine, based on a sub-carrier spacing u1 that is configured or preconfigured, a first number of potential sidelink slots S1 included in the first pattern and a second number of potential sidelink slots S2 included in the second pattern by following:

$$S1 = p1 \times 2^{u1} \text{ and } S2 = p2 \times 2^{u1}; \text{ and}$$

- determine the first number of bits N1 indicating a first portion of the plurality of potential sidelink slots and the second number of bits N2 indicating a second portion of the plurality of potential sidelink slots.

* * * * *